(12) United States Patent
Lee et al.

(10) Patent No.: US 8,452,336 B2
(45) Date of Patent: May 28, 2013

(54) MOBILE TERMINAL AND CALL CONTENT MANAGEMENT METHOD THEREOF

(75) Inventors: In-Jik Lee, Seoul (KR); Sun-Hwa Cha, Seoul (KR); Jae-Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/365,186

(22) Filed: Feb. 2, 2012

(65) Prior Publication Data

US 2012/0129576 A1    May 24, 2012

Related U.S. Application Data

(63) Continuation of application No. 12/345,214, filed on Dec. 29, 2008, now Pat. No. 8,145,273.

(30) Foreign Application Priority Data

Apr. 30, 2008    (KR) .......................... 10-2008-0040502

(51) Int. Cl.
    *H04B 1/38*    (2006.01)
(52) U.S. Cl.
    USPC ......................................................... 455/563
(58) Field of Classification Search
    USPC ......................................................... 455/563
    See application file for complete search history.

(56) References Cited

U.S. PATENT DOCUMENTS

2005/0125235 A1*  6/2005  Lazay et al. ................. 704/275
2006/0046769 A1   3/2006  Arun

* cited by examiner

*Primary Examiner* — Lincoln Donovan
*Assistant Examiner* — Daniel Rojas
(74) *Attorney, Agent, or Firm* — Birch, Stewart, Kolasch & Birch, LLP

(57) ABSTRACT

A method for operating a mobile terminal, and which includes performing voice recognition on call content to produce recognized call content, converting the recognized call content into one or more units of character information, registering the one or more units of character information to one or more particular functions of the mobile terminal based on a type of the character information or a field of the character information, inputting a search parameter, searching one of a plurality of file types and identifying a file related to both the search parameter and the one or more registered units of character information, and displaying or automatically executing the identified file.

18 Claims, 21 Drawing Sheets

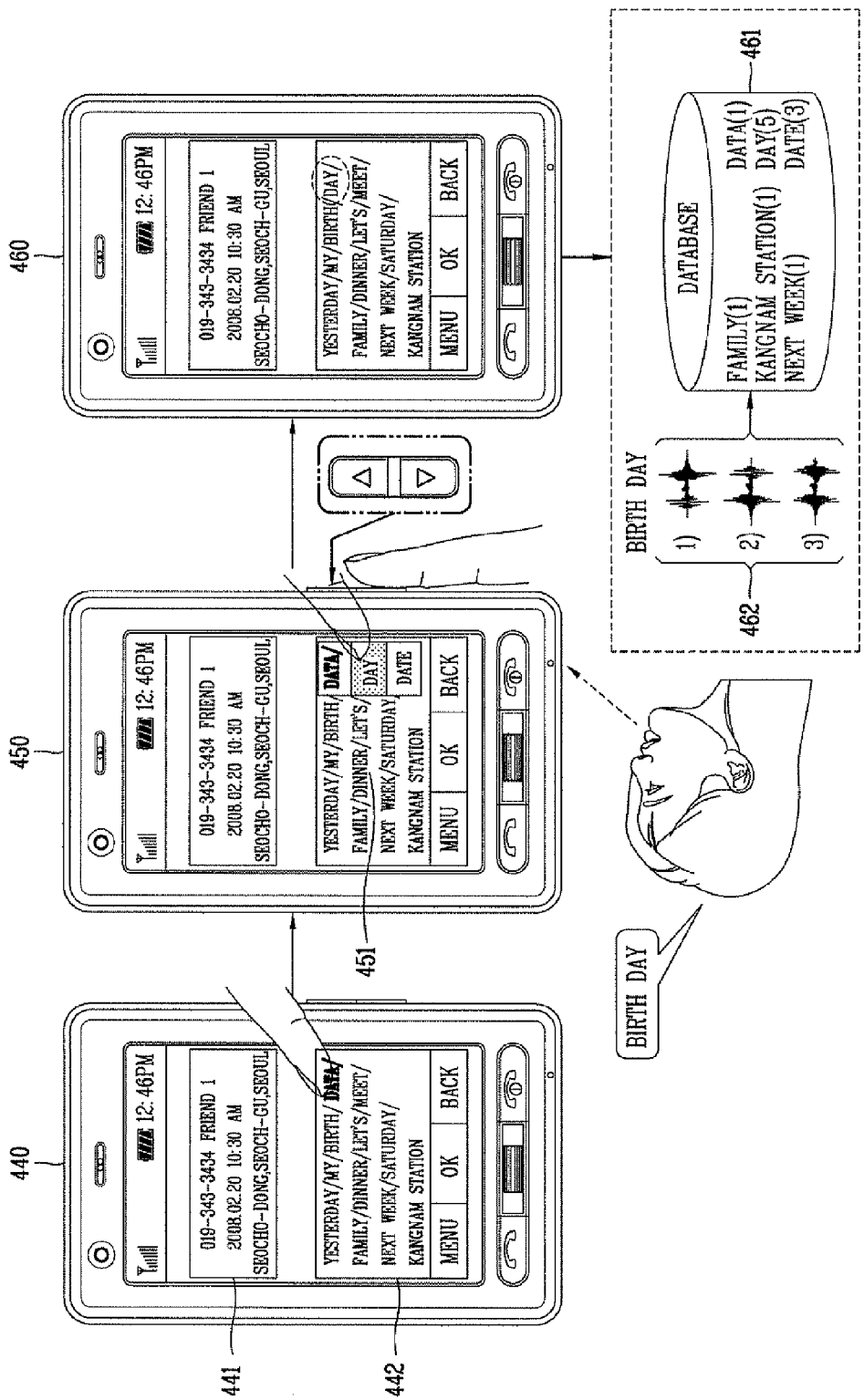

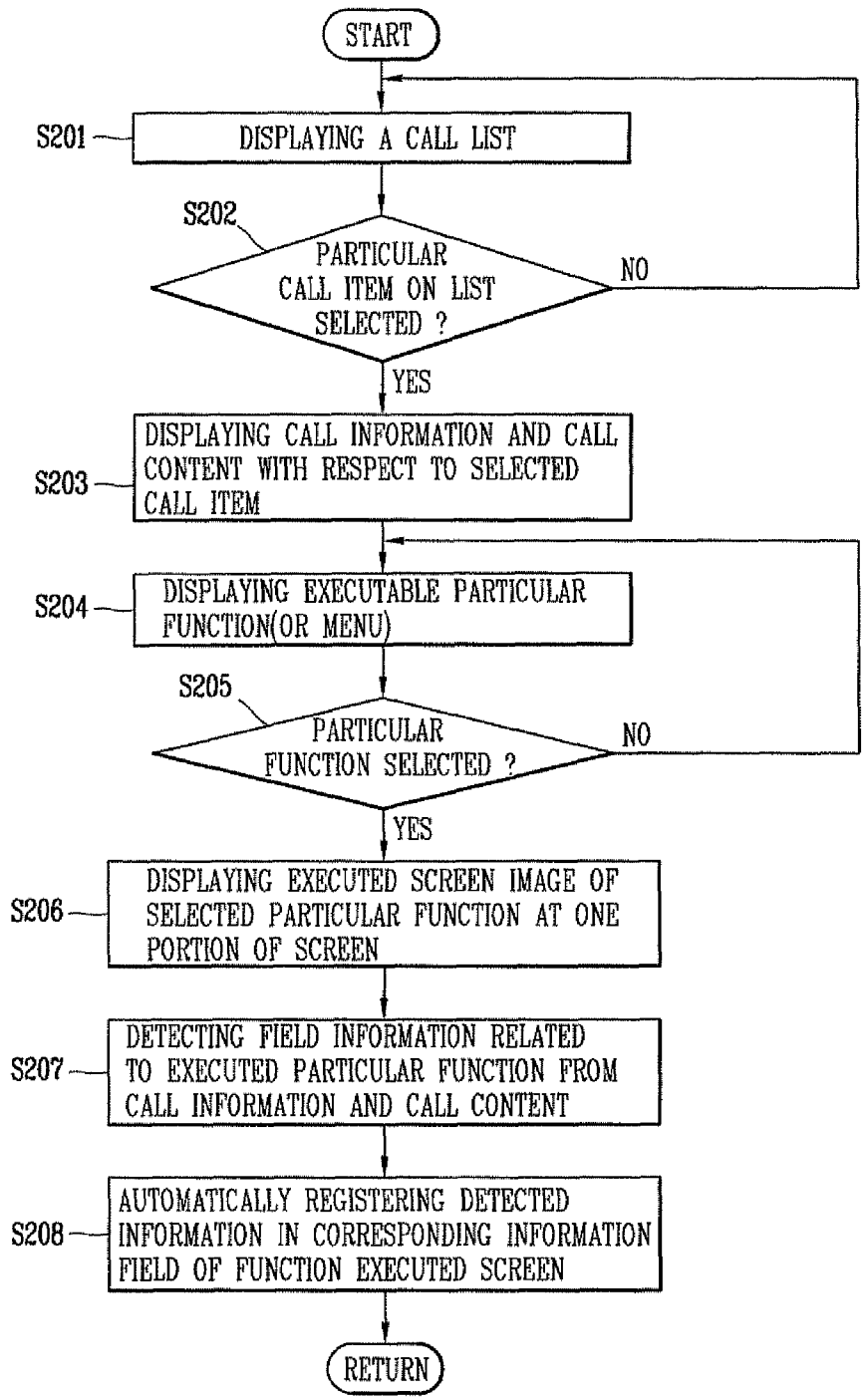

MOBILE TERMINAL AND CALL CONTENT MANAGEMENT METHOD THEREOF

CROSS REFERENCE TO RELATED APPLICATIONS

This application is a Continuation of application Ser. No. 12/345,214 filed on Dec. 29, 2008 now U.S. Pat. No. 8,145,273, which claims priority to Korean Application No. 10-2008-0040502, filed on Apr. 30, 2008. The entire contents of all of the above applications are hereby incorporated by reference.

BACKGROUND OF THE INVENTION

1. Field of the Invention

The present invention relates to a mobile terminal and a corresponding computer program product and call content management method capable of automatically processing call content in association with a particular function of a mobile terminal related to the recognized call content 2. Description of the Related Art A mobile terminal is a device which may be configured to perform various functions. Examples of such functions include data and voice communications, capturing images and video via an image capture device, recording audio data, playing music files via a sound output system, and displaying images and video on a display device. Other functions include calendar management, word processing, email and the like. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. In terms of design or form factor, a folder type, a slider type, a bar type, or a rotation type design may be applied for mobile terminals.

In addition, some related art mobile terminals include a user interface for recording call content or user's voice instructions. For example, some related art mobile terminals have a function of making a call in response to a user's voice instruction or recording contents of call communication and later playing back the same in response to a user's voice instruction. However, the related art mobile terminal cannot associate the function related to a call to the various functions of the mobile terminal and efficiently use the associated function.

SUMMARY OF THE INVENTION

Accordingly, one object of the present invention is to address the above-noted and other drawbacks.

Another object of the present invention is to provide a mobile terminal, computer program product and a method for managing call content of the mobile terminal capable of processing such that the call content is associated with a relevant particular function of the mobile terminal.

Still another object of the present invention is to provide a mobile terminal, computer program product and a method for managing call content of the mobile terminal capable of converting recognized call content into characters and detecting pre-set particular key words to configure a database.

Yet another object of the present invention is to provide a mobile terminal, computer program product and a method for managing call content of the mobile terminal capable of storing character-converted call content by valid words and retrieving and displaying the call content.

Another object of the present invention is to provide a mobile terminal, computer program product and a method for managing call content of the mobile terminal capable of selectively storing the entire call content or a portion of call content stored by words as information related to a particular function of the mobile terminal.

Another object of the present invention is to provide a mobile terminal, computer program product and a method for managing call content of the mobile terminal capable of configuring information related to a particular function of the mobile terminal as a database.

Another object of the present invention is to provide a mobile terminal, computer program product and a method for managing call content of the mobile terminal capable of automatically detecting information related to a particular function of the mobile terminal from recognized call content and registering the information as field data of the particular function.

To achieve these and other advantages and in accordance with the purpose of the present invention, as embodied and broadly described herein, the present invention provides in one aspect a method for operating a mobile terminal, and which includes performing voice recognition on call content to produce recognized call content, converting the recognized call content into one or more units of character information, registering the one or more units of character information to one or more particular functions of the mobile terminal based on a type of the character information or a field of the character information, inputting a search parameter, searching one of a plurality of file types and identifying a file related to both the search parameter and the one or more registered units of character information, and displaying or automatically executing the identified file.

In another aspect, the present invention provides a mobile terminal including a display, a memory, and a controller operatively connected to the display and the memory, the controller configured to perform voice recognition on call content to produce recognized call content, convert the recognized call content into one or more units of character information, register the one or more units of character information to one or more particular functions of the mobile terminal based on a type of the character information or a field of the character information, input a search parameter, search one of a plurality of file types and identifying a file related to both the search parameter and the one or more registered units of character information, and display or automatically execute the identified file.

Further scope of applicability of the present invention will become apparent from the detailed description given hereinafter. However, it should be understood that the detailed description and specific examples, while indicating preferred embodiments of the invention, are given for exemplary purposes only, since various changes and modifications within the scope of the invention will become apparent to those skilled in the art from this detailed description.

BRIEF DESCRIPTION OF THE DRAWINGS

The present invention will become more fully understood from the detailed description given hereafter and the accompanying drawings, which are given for exemplary purposes only, and thus are not limitative of the present invention.

FIG. 7 shows screen images of updating call content stored in a database of the mobile terminal according to an embodiment of the present invention.

FIG. 8 is a flow chart illustrating the process of detecting information related to a particular function of the mobile terminal from recognized call content and associating the same in the mobile terminal according to an embodiment of the present invention.

DETAILED DESCRIPTION OF THE INVENTION

Figure 1:
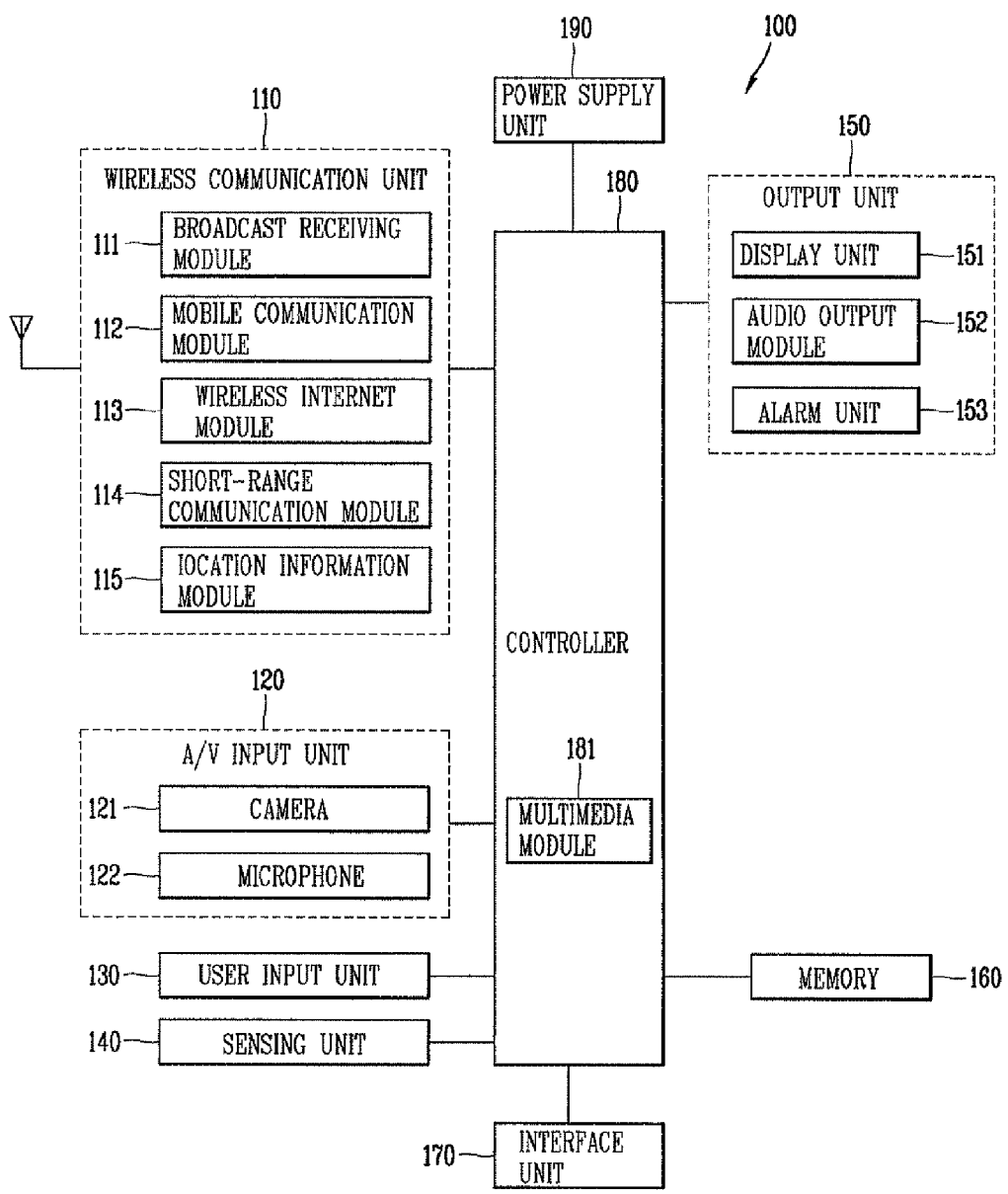
FIG. 1 is a schematic block diagram of a mobile terminal according to an embodiment of the present invention.

Reference will now be made in detail to some exemplary embodiments of the present invention, examples of which are illustrated in the accompanying drawings FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (NV) input unit 120 that provides audio or video signals to the mobile terminal 100. As shown, the NV input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card and a device with an identity module), audio input/output ports and video input/output ports.

In this instance, an identity module includes a chip for storing various kinds of information for identifying or authenticating a use authority of the terminal 100. And, the identity module can include one of a user identity module (UIM), a subscriber identity module (SIM), a universal subscriber identity module (USIM), and the like. In particular, the identity module can include a module for identifying or authenticating an authority for a broadcast purchase and/or a broadcast viewing using the terminal 100. And, a device provided with the identity module (hereinafter named 'identity device') can be manufactured into a smart card. Therefore, the identity device can be connected to the terminal 100 via an identity device connecting port.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Next, FIG. 2A is a front side view of the mobile terminal 100 according to an embodiment of the present invention. As shown in FIG. 2A, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 2:
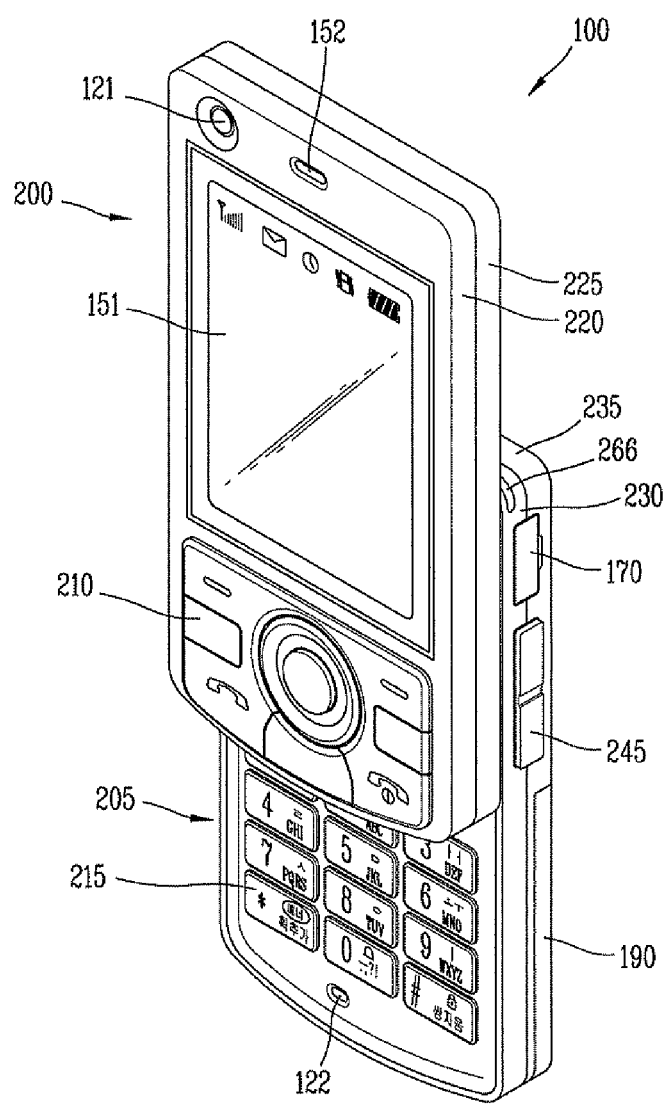
FIG. 2 is a front perspective view of the mobile terminal according to an embodiment of the present invention.
Figure 3:
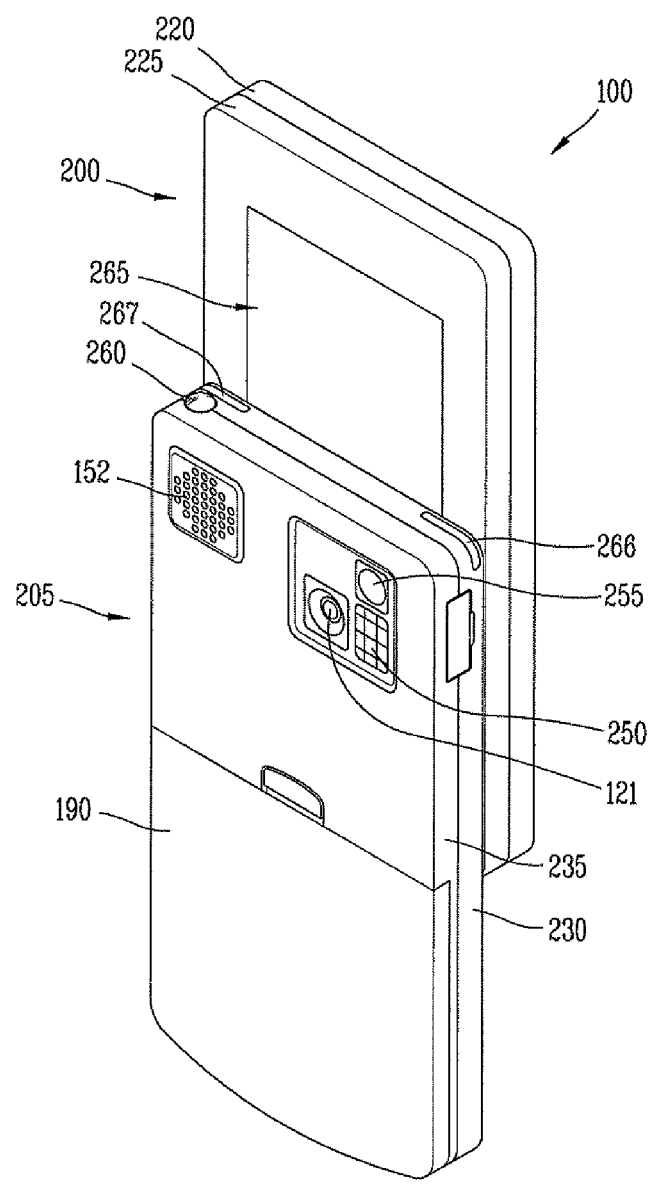
FIG. 3 is a rear perspective view of the mobile terminal in FIG. 2.

FIG. 3 is a rear side view of the mobile terminal 100 shown in FIG. 2A. As shown in FIG. 2B, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 2B) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

FIG. 3A and FIG. 3B are diagrams for depicting how an identity device is detachably loaded in a terminal according to one embodiment of the present invention. In this case, the identity device can include a SIM card.

Referring to FIG. 3A and FIG. 3B, the identity device 310 is detachably provided to the terminal 100. Therefore, an old identity device can be replaced by a new identity device in the terminal 100. The identity device 310 can be loaded in the terminal 100 by being assembled to the interface unit 170. Alternatively, the identity device 310 can be loaded in the terminal 100 by being connected with a connector separately provided for the assembly to the identity device 310.

Besides, a connecting mechanism for connecting the identity device 310 and the terminal 100 together can be provided to any part of the terminal 100 such a backside, a lateral side, a front side and the like thereof.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
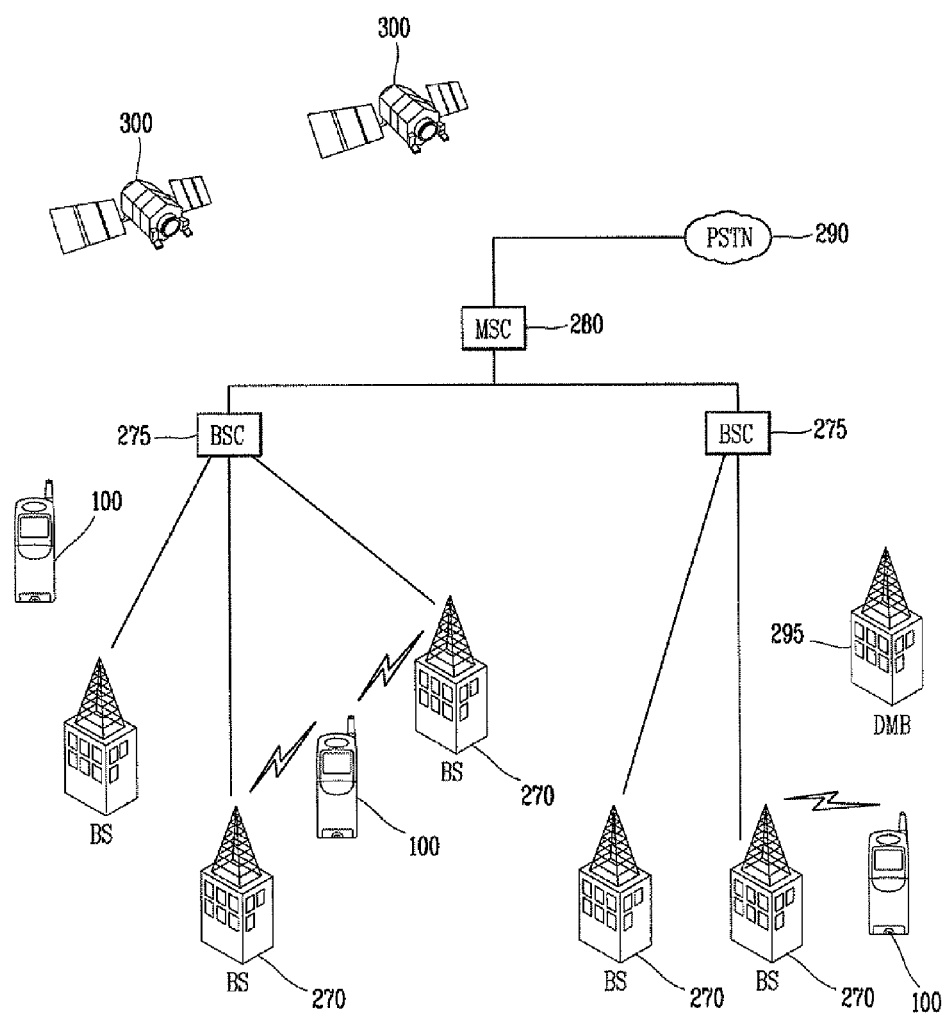
FIG. 4 is a block diagram of a wireless communication system operable with the mobile terminal according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

The following description focuses on how the contents of a voice call are processed. Voice recognition needs to be performed, and many types of algorithms and techniques for recognizing voice commands may be used.

Figure 5:
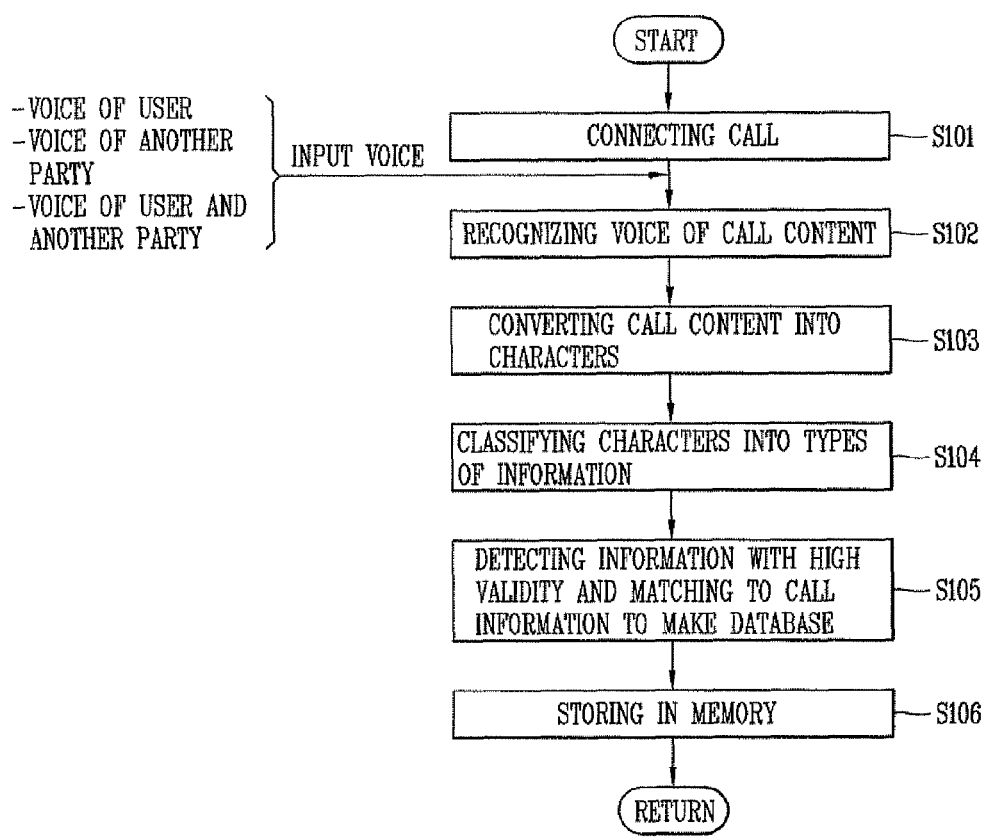
FIG. 5 is a flow chart for illustrating the process of configuring a database with call content recognize by a mobile terminal according to an embodiment of the present invention.

FIG. 5 is a flow chart for illustrating an exemplary process of configuring a database with call content recognized by a mobile terminal according to an embodiment of the present invention. As shown, when a call connection is made (S101), the controller 180 of the mobile terminal recognizes call content according to a particular voice recognition algorithm (S102) and converts the recognized call content into characters (S103).

The controller 180 then classifies the converted characters into certain units of information (S104). The units of information may refer to words or syllable information. The call content may be recognized by selecting the voice of a user, the voice of another party, and one of all the voices of the user and another party.

The controller 180 determines the validity (or significance) of the classified certain units of information, and deletes information having relatively low validity (or significance). In other words, the controller 180 detects only information with high validity (or significance) and configures a database (or other storage format) (S105). Here, the controller 180 may link the units of information with high validity (or significance) to call information. The controller 180 then stores the linked information in a database in the memory 160 (or other storage medium).

Further, the validity (or significance) is information where the meaning of call content may be determined. For example, in terms of grammar, nouns (e.g., yesterday, today, birthday, family, meal, day) and verbs (e.g., meet, eat, see) are considered to have high validity, while adjectives, auxiliary words (prepositions, etc), relatives, conjunctions, or the like, are considered to have low validity. Semantically, information regarding dates, information regarding time, information regarding areas, and information regarding operations (or activities) are considered to have high validity.

The call information may also include at least one of a date and time of a call, a phone number of the other party, information (e.g., name) about people or items registered in a phone book, location information of a user and location information of another party, and the like. In addition, the location information may be detected by the terminal itself by using a GPS (Global Positioning Service) antenna or may be received from a mobile communication system. The location information may be displayed in a coordinate format (e.g., 37° 33' 49" north latitude, and 126° 59' 50" east longitude) or in an address format (e.g., Seocho-dong, Seocho-gu, Seoul or 1500 Pennsylvania Avenue, Washington D.C.).

Figure 6:
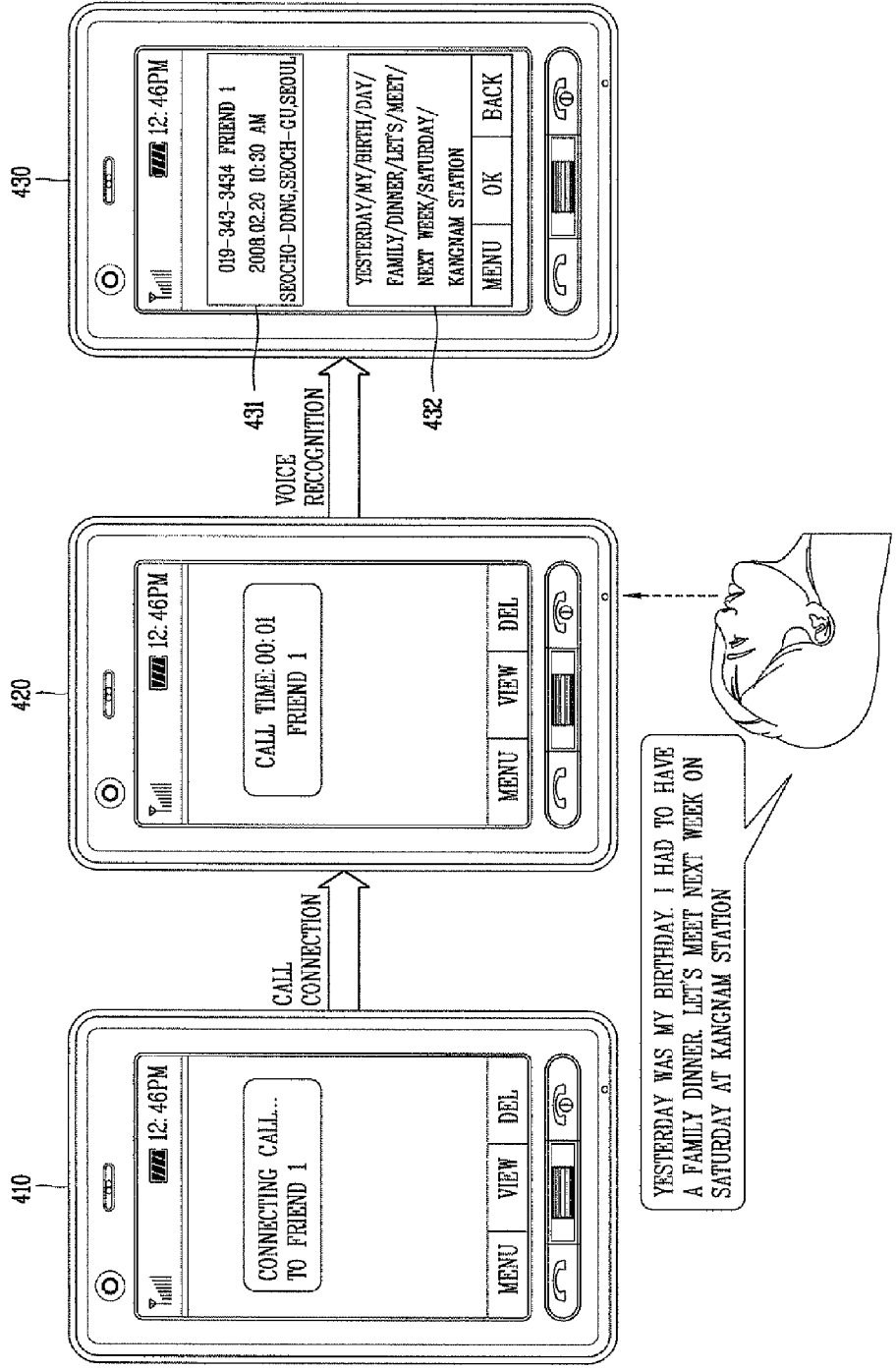
FIG. 6 shows screen images of configuring a database by recognizing call content in the mobile terminal according to an embodiment of the present invention.

Next, FIG. 6 shows some exemplary screen images of configuring a database by recognizing call content in the mobile terminal according to an embodiment of the present invention. The mobile terminal calls a particular person (e.g., friend 1) selected by the user (410), and when the call is connected to the particular person, voice call communication begins (420).

When the call is connected with the person, the controller 180 recognizes the call content (i.e., the words spoken between the parties) according to a particular instruction received before the call or during call communication.

The particular instruction may be received by user manipulation, such as a key input, a touch input, a voice input or other user command.

Then, the controller 180 converts the recognized call content into characters (i.e., letters, words, text, etc.) and classifies them into certain units of information. The controller 180 may then detect information of high validity and configure such into a database or may display such items (432). The controller 180 may display call information 431 and may configure the database by adding the call information thereto.

The call content and the corresponding call information may be displayed in real time, namely, as the call is in progress (430). In addition, after the call is terminated, when a call list is searched, the call content and the call information may be displayed to the user. In this instance, the controller 180 may divide the screen region of the display unit 151 to display the call content and the call information, respectively.

In the call content that is displayed in real time, only the units of information with high validity are detected and stored as character information in order to minimize the amount of memory capacity used in storing the call content.

FIG. 7 shows some exemplary screen images associated with updating call content stored in a database of the mobile terminal according to an embodiment of the present invention.

Voice recognition may not be precise due to variations in user voice characteristics (e.g., pronunciation, intonation, etc.). Thus, the voice recognition software (or program) of the mobile terminal may need to learn the particular characteristics of the user through trial-and-error sessions, through training modes that ask the user to repeat certain words until recognition is possible, and other techniques. For example, if the user says the word 'date', but the voice recognition software inaccurately recognizes such word as being 'data', the user may interact with the voice recognition software to make any necessary corrections such that the voice input word 'date' can be recognized properly in the future.

As shown in FIG. 7, when a call list is searched and a particular call is selected by the user, the controller 180 displays the call content 442 and call information 441 on the screen(s). By viewing the call content 442, the user can select any erroneous information (or words) being displayed. The erroneous information may be selected by the user through touch inputs, key inputs, voice inputs, or the like (440).

When an erroneous word is selected, the controller 180 displays information 451 (i.e., other words, phrases, etc.) that have a similar pronunciation to that of the selected erroneous word (450). For example, if 'data' is selected as being an erroneous word, the controller 180 displays alternative words (such as 'date' and 'day') that can be viewed and selected by the user. The displaying of such alternative words may be performed in a pop-up window (that is semi-transparent, opaque, etc.), shown on a different screen, or in some other display format. Here, the alternative words may be displayed in a particular ranking order in a list. Such ranking order may be determined by the voice recognition software based upon prior word usage history, based upon the context of the other words, or by some other criteria. Candidate words having higher probability of accuracy may be displayed at the top of the list to facilitate user selection.

After a plurality of information items (i.e., words, phrases, etc.) are displayed, the controller 180 detects the user selection (made via touch input, key input, voice input, etc.), then updates the database 461 with the selected information, and displays the updated (or corrected) call content (460).

The mobile terminal may include a database for storing the call content and also a database for storing pronunciation information for voice recognition and corresponding character information. The updated character information can be used as a basis for more accurate recognition of future user voice inputs so as to improve the voice recognition accuracy of the voice recognition software (program or algorithm).

In addition, if a particular word or phrase is frequently corrected, such frequency of correction (or updating) can also be tracked and stored. Accordingly, such words, phrases, etc. that are updated (or corrected) often can be shown at the top of a list to be displayed to the user for easy selection thereof. Also, multiple types of pronunciations (462) for a single word (or phrase) can stored such that variations in pronunciation by the same user or by different users can be more accurately recognized.

Also, updating or correction of the call content may be performed in real time while the user views the screen during call communication, in particular, during a video call or a headset call that allows the user to view the screen and use his hands to select words or phrases that require correction.

Meanwhile, the controller 180 may selectively process (e.g., delete, add, edit, etc.) certain information (words, phrases, etc.) displayed as the call content. In doing so, the controller 180 may display instructions to the user for processing the selected information (words, phrases, etc.).

FIG. 8 is an exemplary flow chart illustrating the process of detecting information related to a particular function of the mobile terminal from recognized call content and associating the same in the mobile terminal according to an embodiment of the present invention.

Call content and call information of a particular call recognized by the mobile terminal may be selectively displayed, with the user executing a particular function provided in the mobile terminal. For example, the particular function may be related to a scheduler or calendar, a to-do list, a memo option, a wake-up call, alarm functions, and the like.

Types of information detected from the call content and call information may vary according to the selected particular function, namely, depending upon the type of an information field that can be inputted to the selected particular function. The types of information may be classified according to their meanings or type, such as information regarding a date (e.g., day of the week information, weekly information, etc.), information regarding time (e.g., current time, AM-PM, etc.), information regarding a place (e.g., location name, subway stations, bus stops, etc.), and information regarding an operation or activity (e.g., meal appointments, photographing, exercise, sight seeing, events, etc.).

The following passages describe a process of retrieving field information related to a particular function of the mobile terminal from the call content or call information and associating it to the particular function, when information regarding the particular function is executed. When the controller 180 recognizes the call content of each call, the controller 180 classifies the call content into certain units of valid information and compiles such information into a database.

When a particular call item is selected from a call list by the user, the controller 180 displays call information and call content with respect to the selected call item and particular functions (or menus) for using the information (i.e., the call information and the call content) on the display screen(s) (S201 to S204).

Figure 9A:
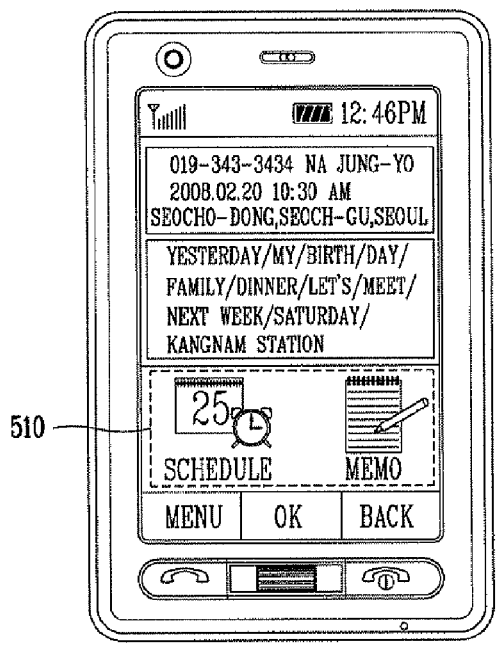
FIGS. 9A and 9B show screen images of displaying a list of functions related to the call content in FIG. 8.
Figure 9B:
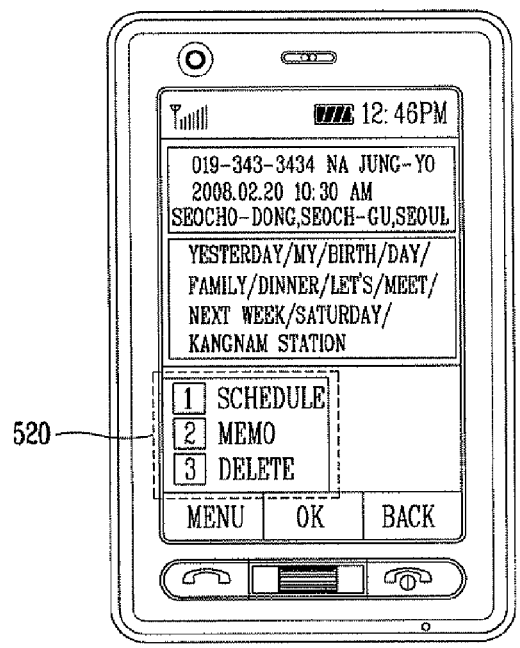

The particular functions (or menus) may be displayed as icons (510) as shown in FIG. 9A, may be displayed as a menu list (520) as shown in FIG. 9B, or may be automatically displayed when the information regarding the selected call items are outputted (510).

In addition, when a menu call key is activated by the user, the menu of the functions may be displayed (520). When one of the displayed particular functions is selected, the controller 180 executes the selected function and displays a function execution screen image (S205). When the selected function is executed, the controller 180 may divide the display unit 151 into a plurality of display regions to display the function execution screen image at one display region and information (e.g., the call information and call content information) that may be referred to for the executed function at another display region (S206).

The controller 180 may also detect the types of information related to the selected particular function from the call information and the call content (S207), and automatically input the respective detected information to corresponding information fields of the executed function (S208).

Figure 10:
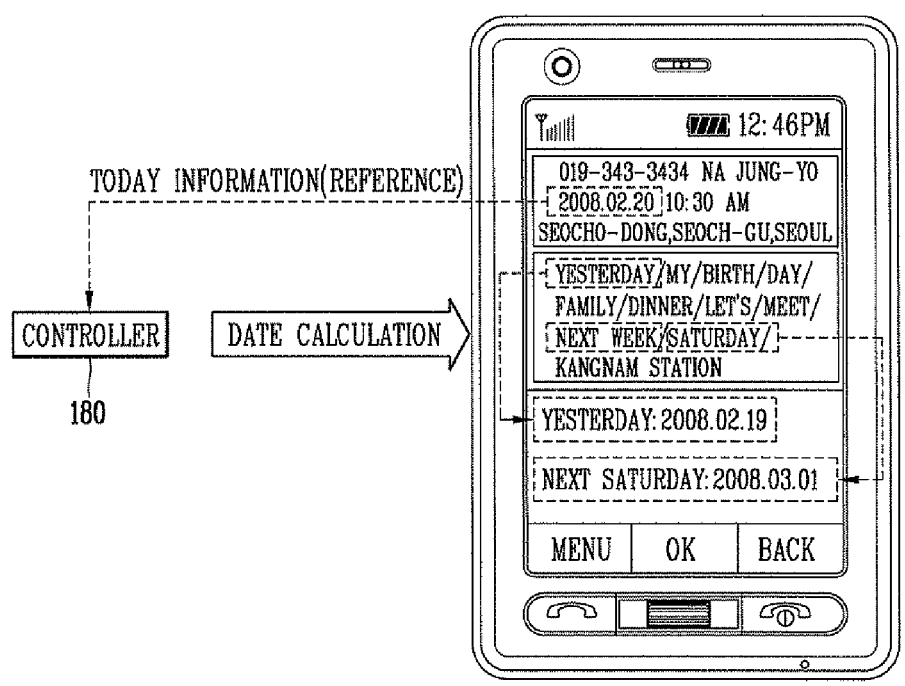
FIG. 10 is a screen image showing automatically calculating a date or a time from call information and call content in the mobile terminal according to an embodiment of the present invention.

In this instance, if there is an information field regarding the date and time among the information fields related to the particular function, the controller 180 may calculate a past or future date and time based upon the current date and time information from the call information. For example, as shown in FIG. 10, if today is 'Feb. 20, 2008, Wednesday', the controller 180 may automatically calculate yesterday as 'Feb. 19, 2008, Tuesday', and next Saturday as 'Mar. 1, 2008, Saturday'.

If the call content includes a plurality of information related to time, the controller 180 may set time information related to 'future' events to have a higher priority level than that of time information related to 'past' events. If the call content includes a plurality of time information related to 'future' events, the controller 180 may set the time information that appears the latest among the call contents such that it has a higher priority level. In addition, the controller 180 may set the same time information that has been mentioned often to have a higher priority level than that which has been mentioned less often. In this manner, time information having the highest priority level is automatically inputted as the field information of the executed function according to the set priority level.

If the information related to the particular function includes information, among the displayed call information and call contents, that cannot be automatically inputted, information that has been classified into certain units may be received by the controller 180 upon selection by the user via an on-screen drag-and-drop technique (or some other user selection option), and such information may be inserted into a particular information field.

Figure 11:
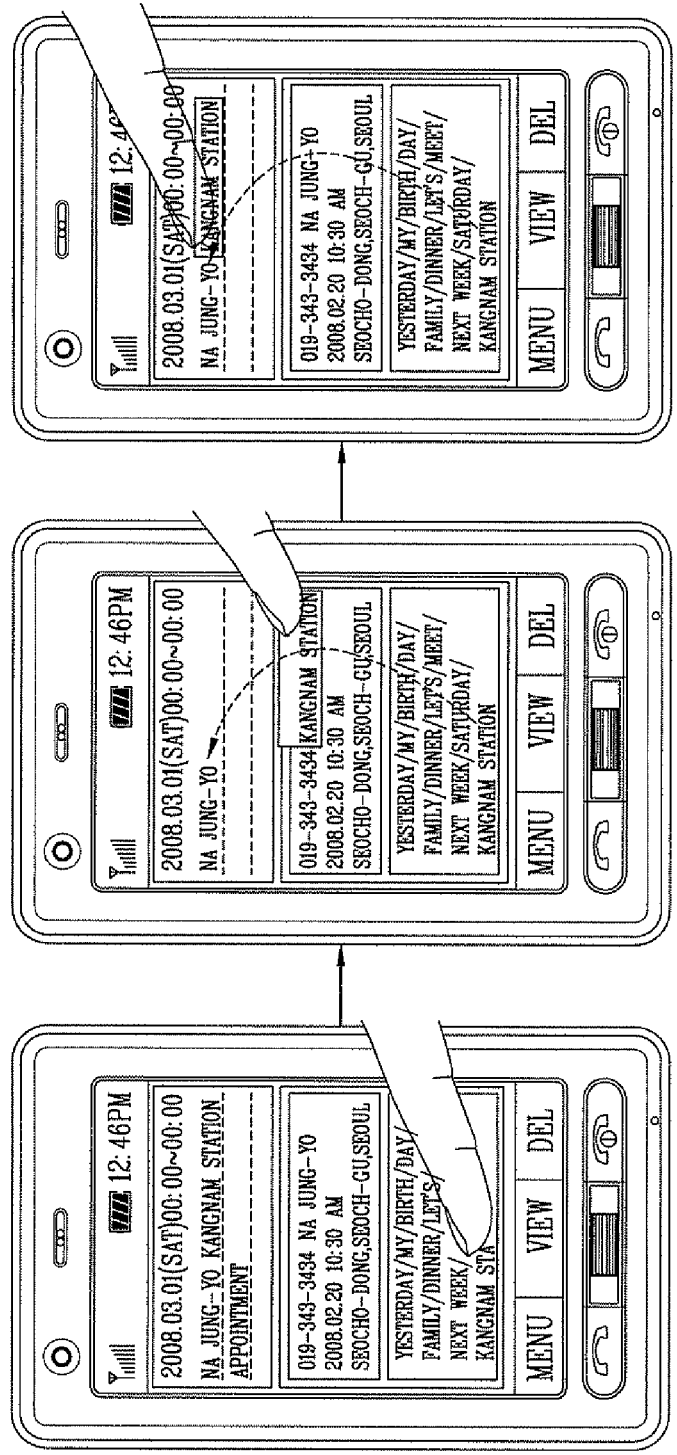
FIG. 11 shows screen images showing inputting of the recognized call content or information required for call information to a content field of a particular function in the mobile terminal according to an embodiment of the present invention.

For example, as shown in FIG. 11, the 'name information' of a peer (or opposing party) may be selected from the call information and the 'place information' (or name of a place) may be selected from the call content and then inserted into the content field of the function execution screen image by using a drag-and-drop technique. In addition, the controller 180 may receive information which is not present in the call information or call content from the user via a touch, key or voice input, and input the same to a particular information field.

Figure 12:
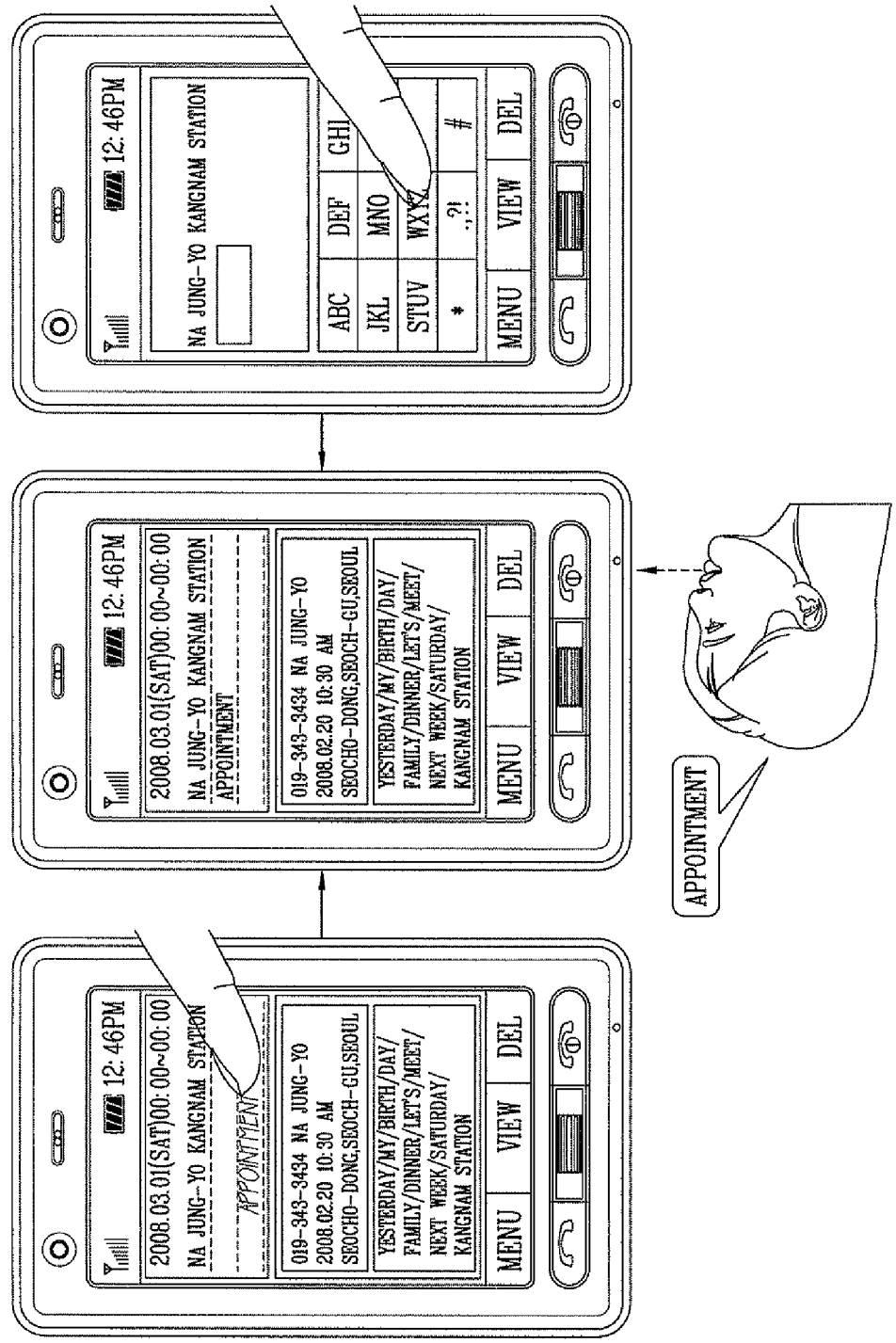
FIG. 12 shows screen images showing inputting of information received from a user as the information of the particular function in FIG. 11.

For example, as shown in FIG. 12, the word 'appointment' may be received via touch inputting, key/button entering or voice commands from the user and entered into the content field of the function execution screen image.

Thus far, the method of retrieving information related to an executed particular function of the mobile terminal from the database storing the call content or the call information and inputting the same to the corresponding information field of the particular function when the particular function is executed, has been described.

A method for associating the above-described call content and call information to a function related to multimedia data (such as images or videos) will now be described.

Figure 13:
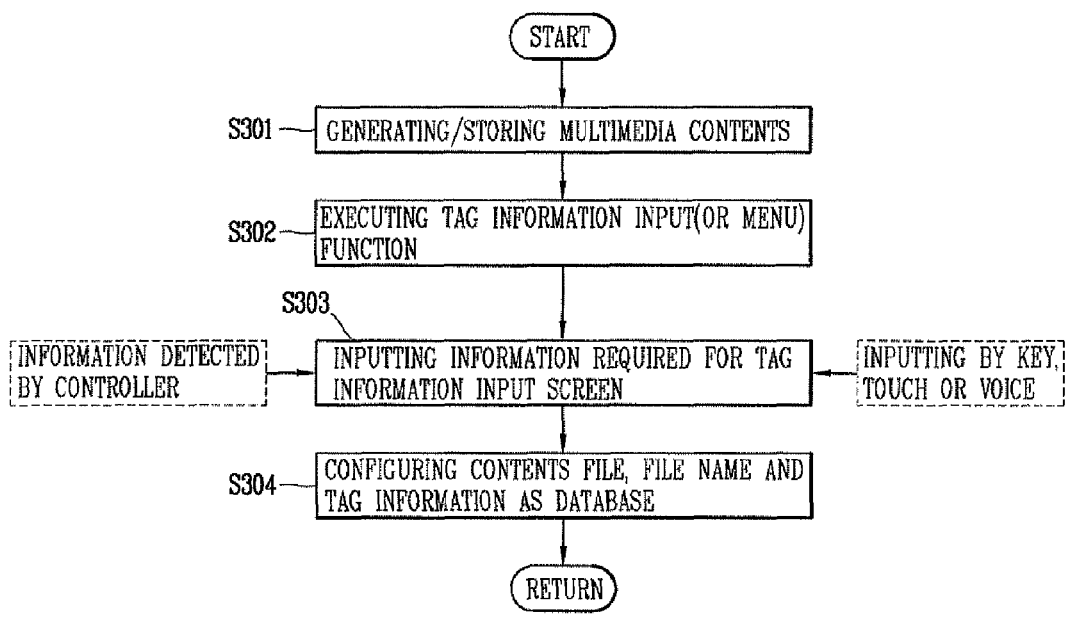
FIG. 13 is a flow chart illustrating a method for inputting tag information to multimedia contents generated in the mobile terminal according to an embodiment of the present invention.

FIG. 13 is an exemplary flow chart illustrating a method for inputting tag information to multimedia contents generated in the mobile terminal according to an embodiment of the present invention.

The process may begin when the user executes a multimedia function of a mobile terminal to generate and store multimedia contents at a particular time (e.g., Mar. 1, 2008, 10:30 p.m.) and at a particular place (Kangnam subway station) (S301). For example, the user is at a certain location (a subway station) with his mobile phone and decides to operate a multimedia function (such as recording a video clip) on his mobile phone (that also knows the date and time of when the multimedia function is operated).

The controller 180 may automatically set a file name (or other type of label) with respect to the generated multimedia contents, and execute a tag information input (or edit) function with respect to the multimedia contents (S302). The tag information input (or edit) function may be automatically executed simultaneously when the multimedia contents are stored, or may be executed according to a user instruction.

Apart from the file name, the tag information refers to information for managing multimedia contents and can be set to allow the user to intuitively recognize the contents or allow easy searching thereof. For example, the tag information may include a location (or place) name where the contents are generated or the name of person(s) or object(s) included in the contents.

When the tag information input (or edit) function is executed, the controller 180 divides the screen of the display unit 151 to display a multimedia contents window (screen image) 611 at one region and a tag information input window (screen image) 612 at another region.

Figure 14:
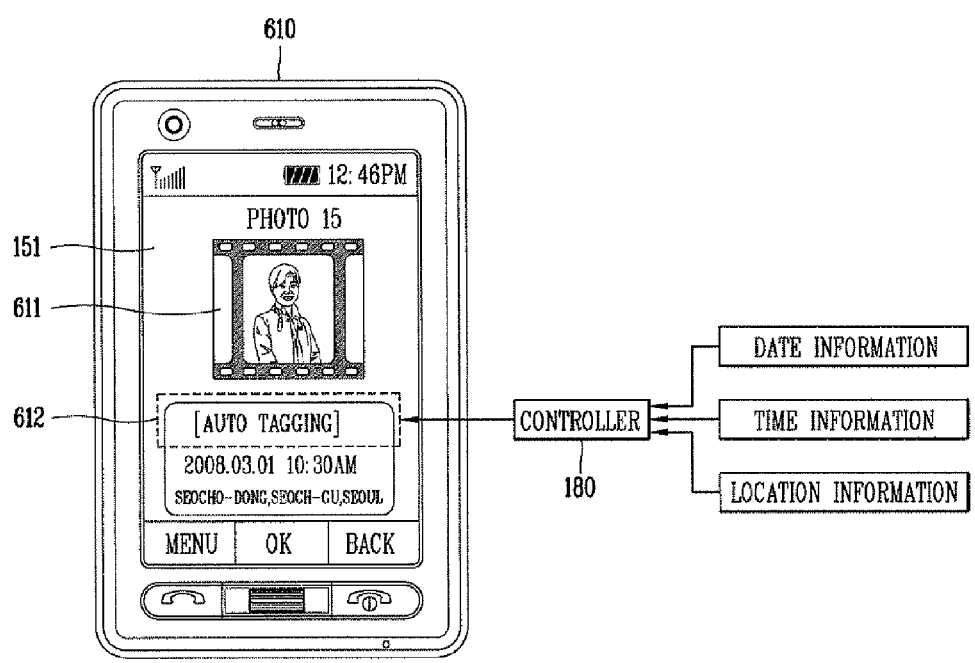
FIG. 14 shows a screen image of showing automatically inputting of tag information in FIG. 11.

As shown in FIG. 14, the controller 180 may automatically input field information (e.g., date, time, place) set as default in the tag information input window 612. This can be referred to as a so-called auto-tagging feature. Also, additional information may be received from the user via key or touch inputting, via voice commands, or other input methods and techniques (S303). In this instance, the controller 180 may output a sound or a text guidance message to allow the user to input tag information 621.

Figure 15:
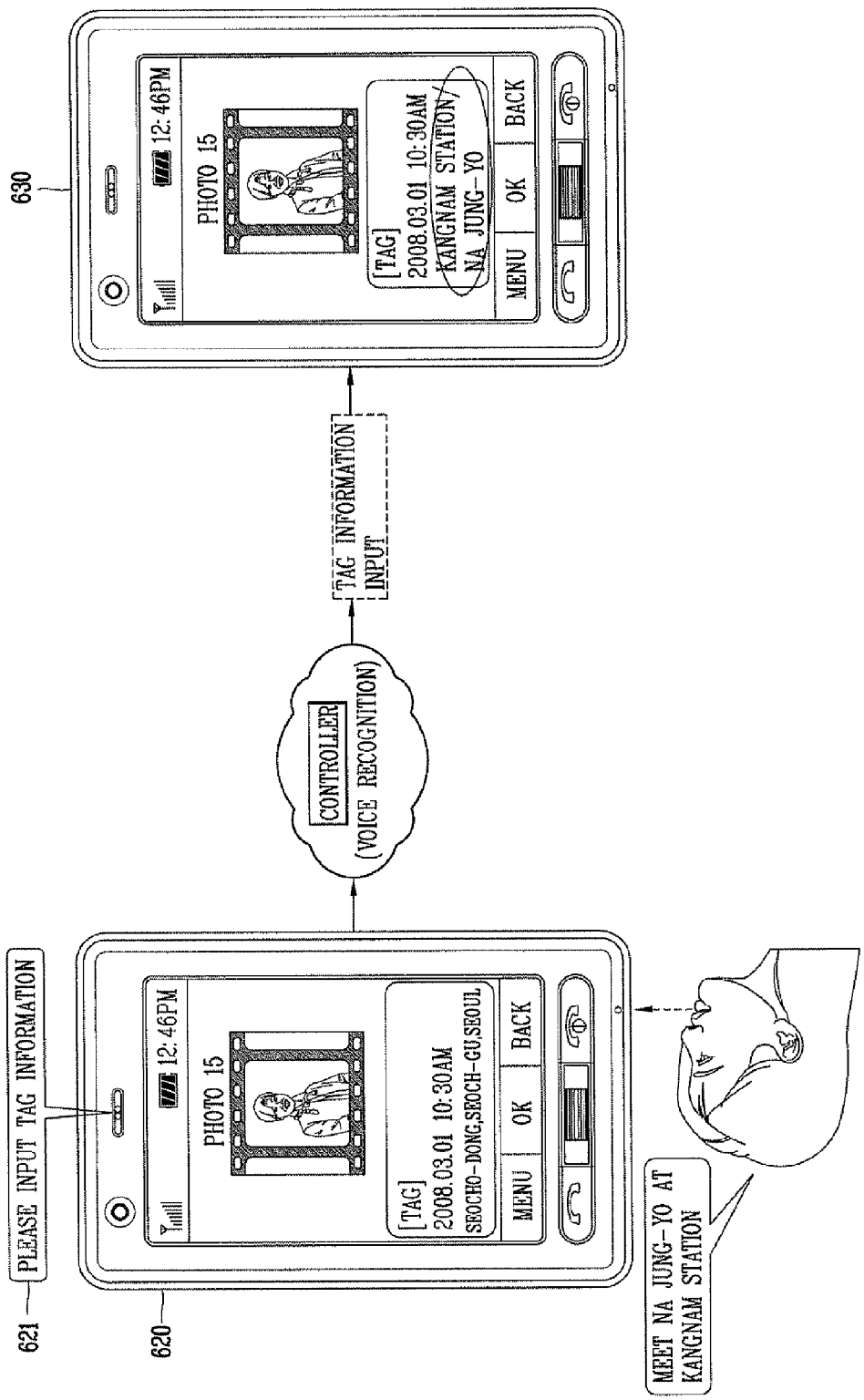
FIG. 15 shows screen images of showing manually inputting of the tag information in FIG. 13.

An exemplary method of inputting tag information according to voice commands will now be described. For example, as shown in FIG. 15, it is assumed that the user says a particular phrase (With Mr. Na Jung-yo at Kangnam station') into the mobile terminal. Then, as described above, the controller 180 detect certain units of information (e.g., Kangnam station/Na Jung-yo) with a high validity from the inputted voice according to the voice recognition algorithm (or software) and inputs the same as tag information 630.

In addition, the controller 180 compiles the information about the multimedia contents into a database and manages the compiled information. For example, the controller 180 configures a database to which the multimedia contents file, the file name, and the tag information correspond (S304). The information stored in the database may be associated with information of a different function.

Figure 16:
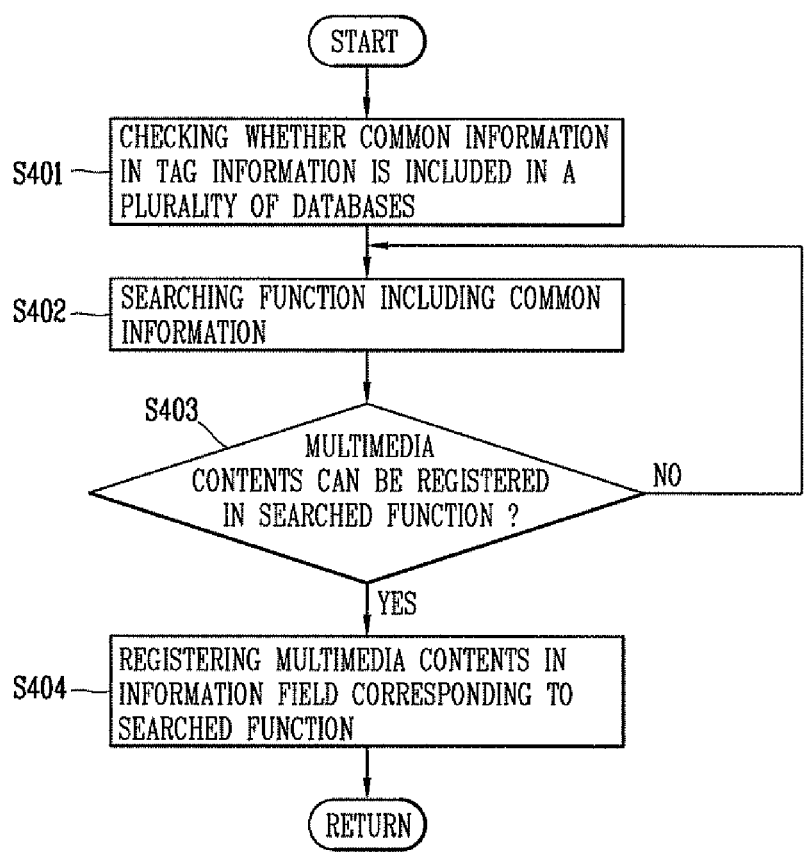
FIG. 16 is a flow chart illustrating a method of associating field information stored in a particular database to information about a different arbitrary function in the mobile terminal according to an embodiment of the present invention.

The method of associating to information of a different function with reference to the field information stored in the database will now be described with reference to FIG. 16.

The controller 180 checks whether there is common information with reference to a database 641 that contains the multimedia contents information, a database 642 that contains the call information and the call content, a database 643 that contains phone book information, and a database 644 that contains information related to a particular function such as a scheduler or memo notation (S401). For example, as shown in FIG. 17, the name of a person (e.g., Na Jung-yo) and an image capture location (e.g., Kangnam station) included in the multimedia contents may be common information of each database.

With the presence of the common information in each database, the controller 180 searches a function available for storing such multimedia contents information (S402). Namely, the controller 180 automatically registers the generated multimedia contents to a function including the common information among functions having a registration field of the multimedia contents information (S403, S404). The function having the field for registering the multimedia contents information may include a phone book function, a schedule function, a memo notation function, and a to-do function.

Figure 17:
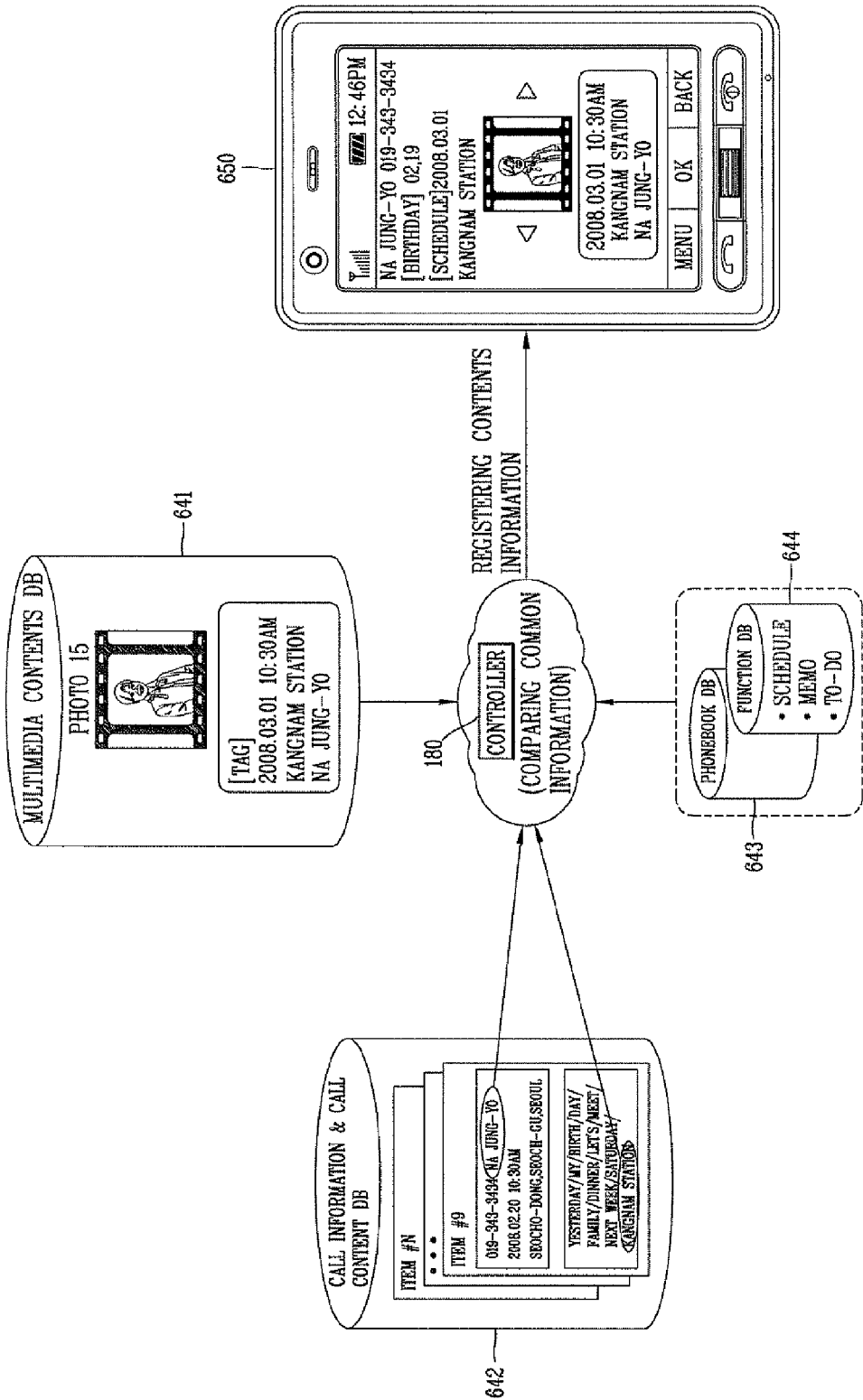
FIG. 17 is an exemplary view for showing comparing of common information stored in a particular data base and registering the same as information about a particular function.

For example, as shown in FIG. 17, the controller 180 adds the generated multimedia contents as field information with respect to a schedule item in which the name (Na Jung-yo) of the person is commonly included on the schedule list 650. Thus, as the function has more common information (e.g., date, time, place, name, activity), it may register more accurately the multimedia contents as information of the corresponding function. Also as shown in FIG. 17, it is possible to scroll between various files/functions using displayed scroll arrows or other scrolling techniques.

In this embodiment, the multimedia contents are registered only to the schedule function, but without being limited thereto, the multimedia contents may be registered to every other function (e.g., phone book, memory, to-do functions), to a function having a field to which each information may be registered, or to a database. Namely, the same information of various types (e.g., multimedia contents information, call information, schedule information, to-do information, memo information) may be associated to various functions so as to be used.

Thus, by using particular information (e.g., keywords) known by the user, the user can easily search for various functions related to the information or various databases in which the information has been registered.

Figure 18:
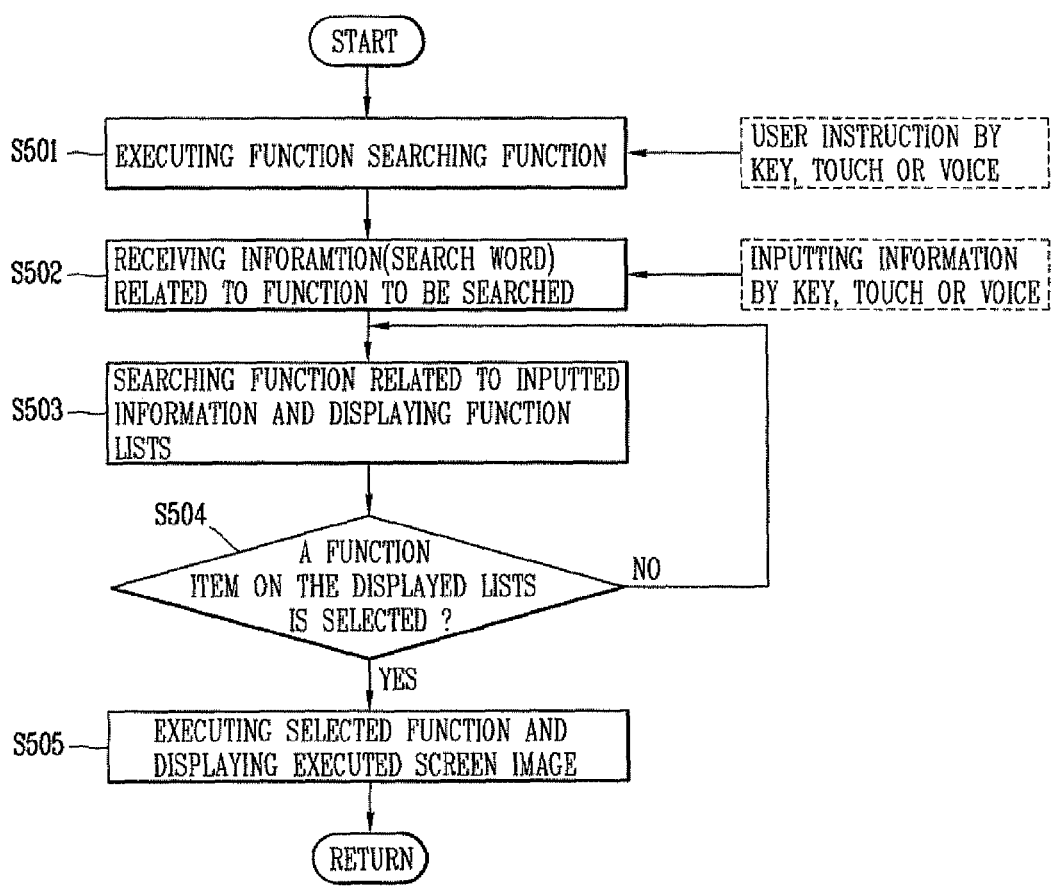
FIG. 18 is a flow chart illustrating the process of displaying a function related to information received from a user or a database list, and selectively executing one of them.

An exemplary method for searching and executing a function in which particular information has been registered or a method for searching and displaying a database in which particular information has been registered will now be described with reference to FIG. 18. In more detail, FIG. 18 is a flow chart illustrating an exemplary process of displaying a function related to information received from the user or a database list, and selectively executing one of them.

Here, the process assumes that the voice-recognized call content or call information has been classified and registered to a function according to a type of information or a database, together with other related information.

The controller 180 executes a search function according to an instruction inputted from the user (S501), and receives information (or a search word) related to the function to be searched (S502). The search function does not refer to searching for particular information registered in a particular function (or database), but refers to searching for a function related to the particular information received from the user.

Upon execution of the search function, the controller 180 searches for the particular functions related to the information received from the user and displays a corresponding function list (S503).

Figure 19:
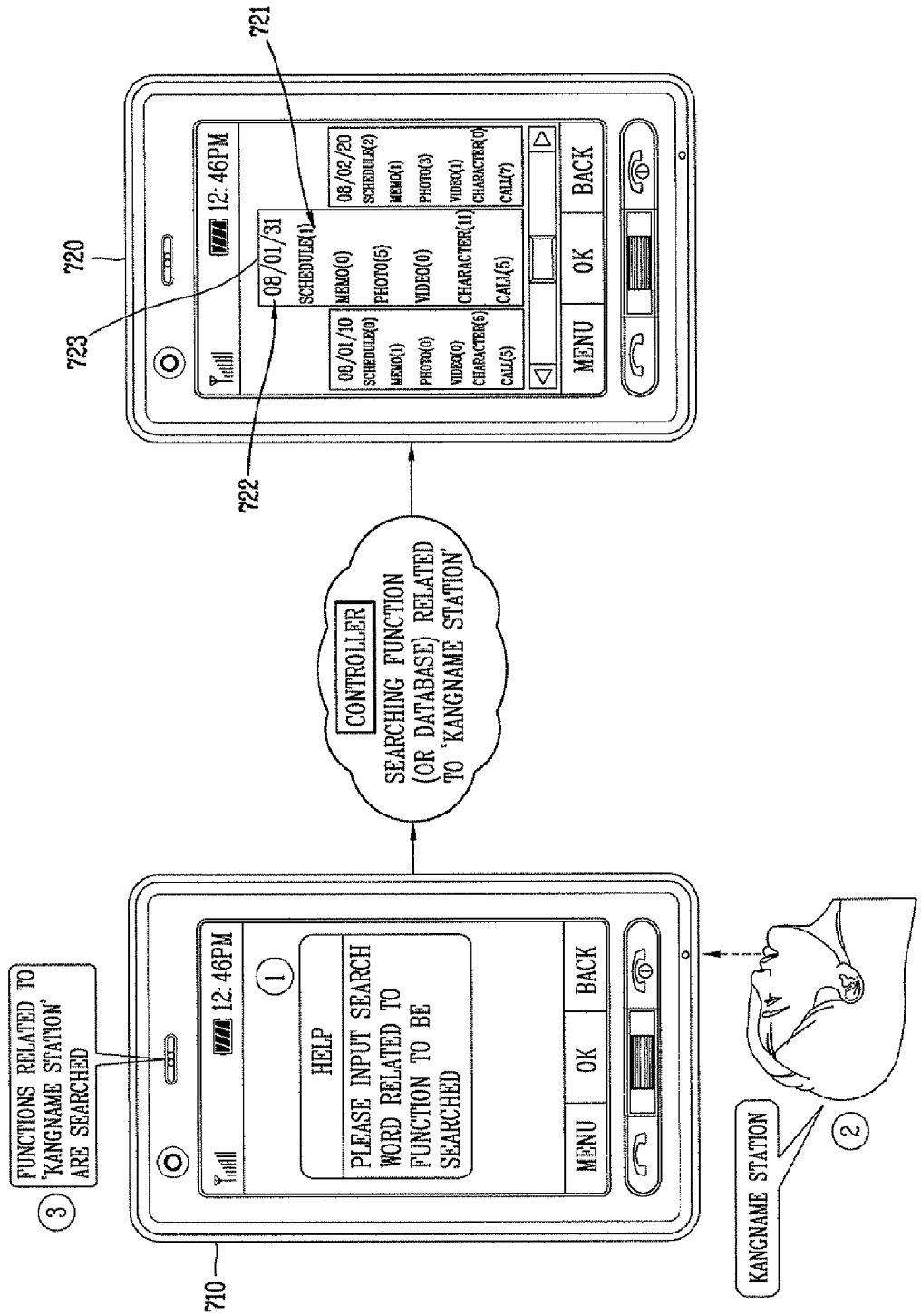
FIG. 19 shows screen images of searching and displaying a list of functions related to a particular search word in FIG. 18.

For example, as shown in FIG. 19, the user executes the information search function and inputs particular words corresponding to location information (e.g., Kangnam Station) as a search parameter via a particular screen (710). The controller 180 performs a search and displays a screen (720) that includes a list of functions (e.g., schedule, memo, video, character, call, etc.) related to the search word (i.e., location information).

The search word (e.g., location information) may be entered by using key inputting, touch inputting, voice commands, or other input method and techniques. The controller 180 may also output (in a visual, audible, and/or tactile manner) a request message (or other indication) requesting the user to enter the search word or a guidance message (or other indication) regarding the start of searching for functions related to the inputted search word.

The number of related information may be displayed on each list of functions (721), and the functions on each list may be sorted by date (or other criteria) and displayed (722). In this instance, the list of functions of the date selected by the user may be displayed in a larger manner than other function lists of different dates, and may be positioned at the center of the screen to thus allow more convenient viewing for the user (723).

Figure 20:
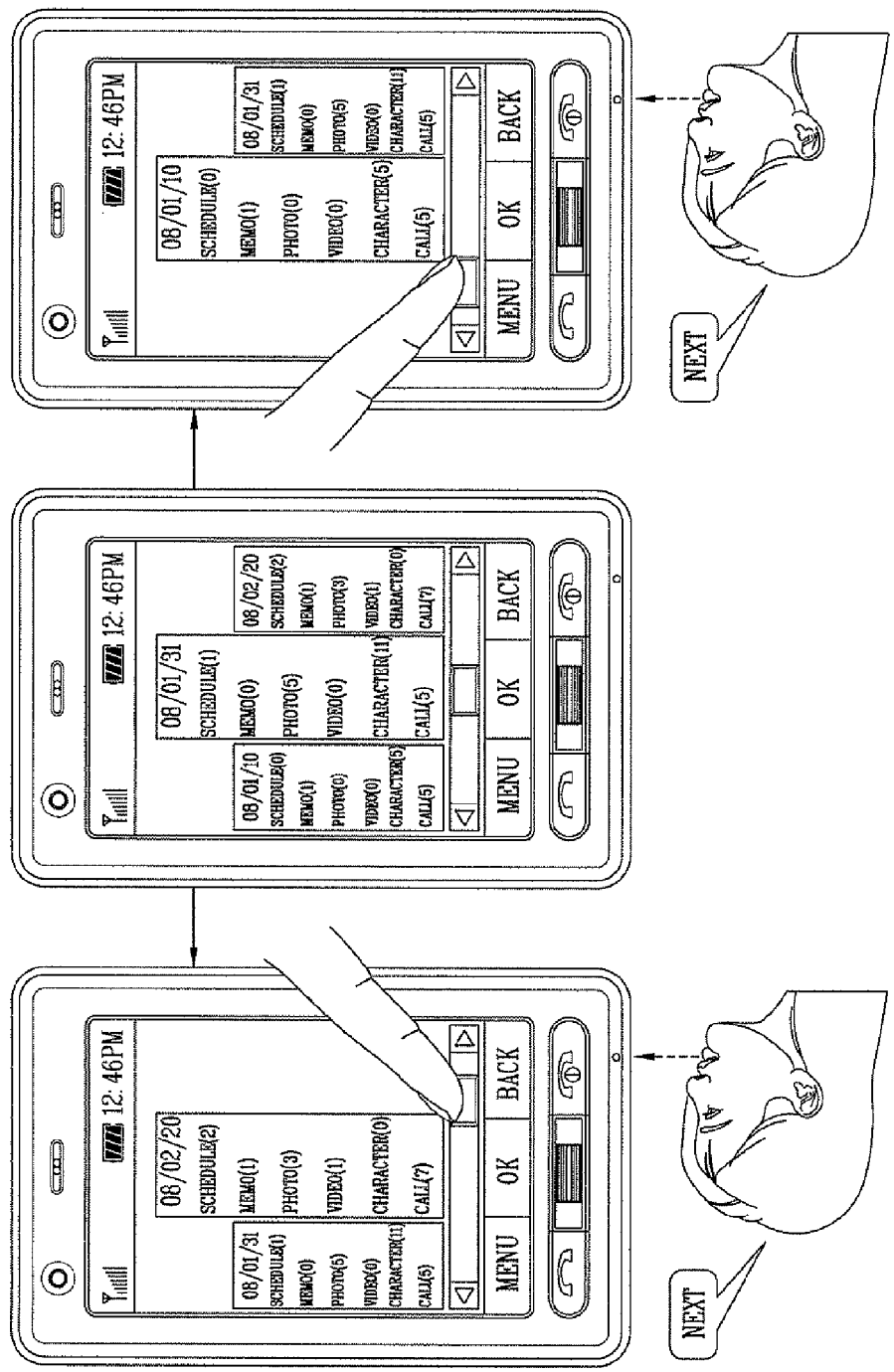
FIG. 20 shows screen images of selecting a list of searched functions in FIG. 19.
Figure 21:
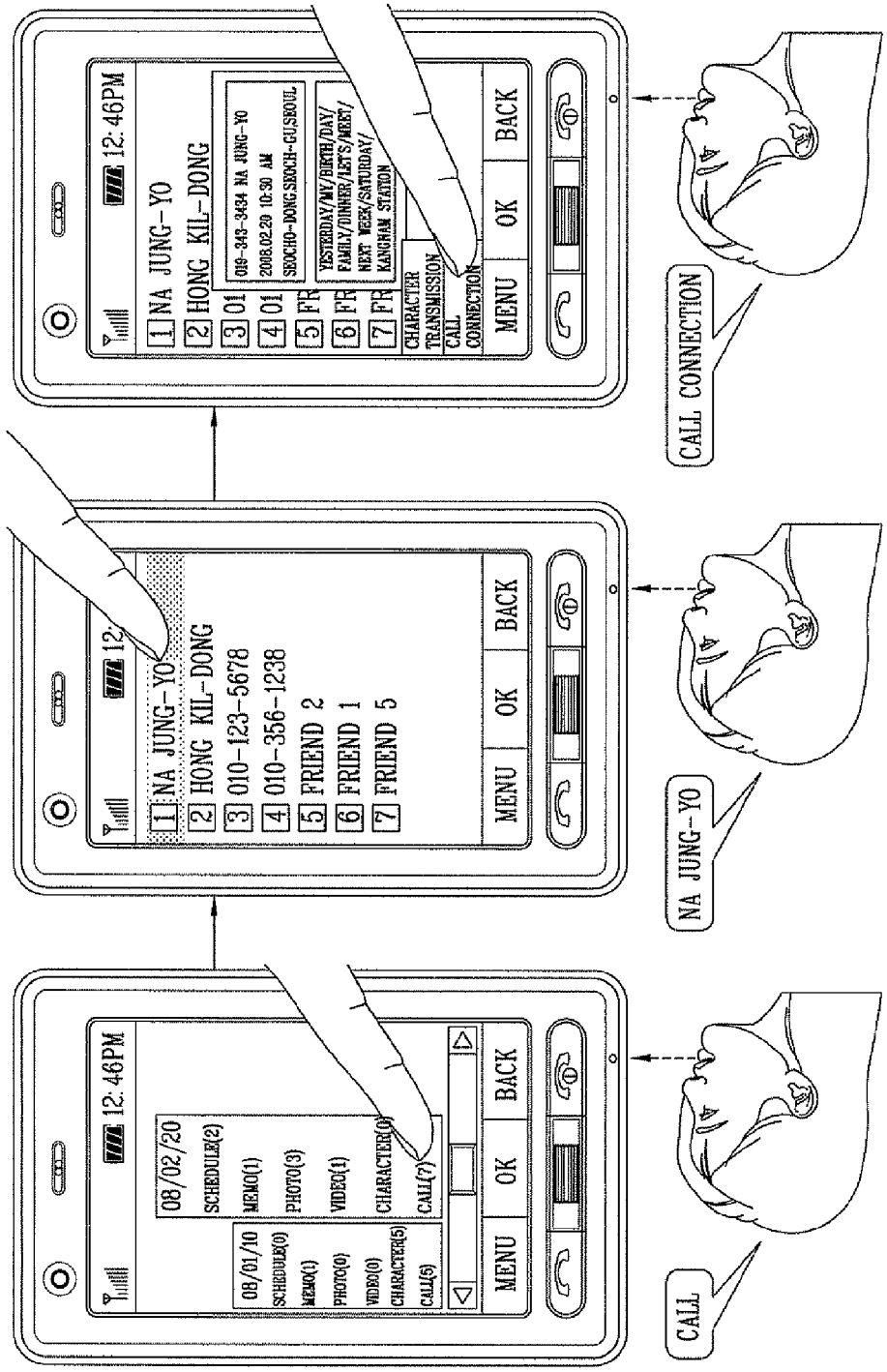
FIG. 21 shows screen images of selecting one of the functions displayed in FIG. 18 and displaying related information or executing related lower functions.

As shown in FIG. 20, the user may select a list of functions displayed by date (using voice commands, key or touch inputs, etc.) and the controller 180 shifts (moves) the selected list to the center of the screen and displays it in a magnified size or some other distinguishable manner (e.g., using various colors, indicators, and the like). Also, when a function item is selected from the displayed list of functions (or from a database) (S504), the controller 180 executes the selected function and display the executed screen image (S505).

For example, assuming that 'call function' is selected from the function list related to location information (e.g., Kangnam Station) (741). The controller 180 displays a call list having call content including 'Kangnam Station'. When one call item is selected by the user from the call list (742), the controller 180 may display detailed information (e.g., call information or call content) with respect to the call item, and also, the user may select a different function (e.g., message transmission or call connection) associated to the call item and then execute the different function.

As so far described, the process of recognizing the user's voice commands (or inputs) and converting such into certain units of valid character information when tag information with respect to call content or particular contents are inputted via voice commands, the process of associating particular functions and information by registering the particular functions related to the call content or contents by using certain units of character information, and the process of searching and executing the functions associated to the particular information have been described in various embodiments.

The mobile terminal and corresponding call content management method can automatically process call contents in association with a particular function of the mobile terminal related to the recognized call contents. The mobile terminal includes a controller that provides control to convert voice-recognized call content into certain units of valid character information, to detect the converted call content and information related to a particular function of the mobile terminal or a database from the call information related to the call, and to register the detected information as field information. There is also a display unit that displays the certain units of valid character information which has been converted from the voice-recognized call content and the call information related to the call under the control of the controller, and a memory that stores the call content, the call information, and the information related to the particular function of the mobile terminal of each database.

The mobile phone of the present invention can perform voice indexing upon analyzing user voice commands or other verbal inputs by using voice recognition software that converts particular words and phrases into text that is stored and displayed to the user. Upon viewing the displayed text, the user can then perform various editing and manipulation functions, such as word-phrase corrections, deletions, additions and the like via touch input commands. Also, various features of the mobile phone (such as a scheduler, a memo function, alarm settings, etc.) can be associated with the displayed words and phrases. The graphical user interface (GUI) with multiple windows, pop-up screens, convenient menu lists, auto-tagging feature and intuitive icons allow convenient user interaction with the displayed words and phrases together with the various features of the mobile phone such that a user-friendly interface is achieved.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. Further, the embodiments of the present invention are applicable to a various types of terminals. Examples of such terminals include mobile phones, user equipment, smart phones, DTV, computers, digital broadcast terminals, personal digital assistants, portable multimedia players (PMP) and navigators.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for operating a mobile terminal, the method comprising:
   presenting help information prompting a voice input requesting an execution of a search function for functions of the mobile terminal;
   displaying a list of menu items corresponding to a plurality of applications of the mobile terminal in response to a receipt of the voice input requesting the execution of the search function for the functions of the mobile terminal;
   displaying detailed information related to a menu item when the menu item is selected from the list of menu items based on a user input; and
   executing one of the plurality of applications corresponding to the menu item in response to a receipt of a voice command based on at least a part of the detailed information.

2. The method of claim 1, wherein the plurality of applications comprise at least one of an application configured for executing a schedule function, an application configured for executing a memo function, an application configured for executing a video function, or an application configured for executing a call function.

3. The method of claim 1, wherein the list of menu items is sorted based on at least one criterion.

4. The method of claim 3, wherein the at least one criterion comprises a date.

5. The method of claim 1,
   wherein the detailed information comprises a portion of call content prerecorded by the mobile terminal, and
   wherein the call content comprises a phone conversation between a user of the mobile terminal and a user of a mobile terminal in communication with the mobile terminal.

6. The method of claim 5, wherein the voice input comprises at least one word included in the call content prerecorded by the mobile terminal.

7. The method of claim 6, wherein the call content comprises at least one of incoming call content or outgoing call content.

8. The method of claim 6, wherein the call content is stored in a database comprising data linked to the list of function items.

9. The method of claim 1, wherein the voice input is related to information regarding time, a place, or an activity.

10. The method of claim 9, wherein the activity comprises at least one of a meal appointment, photographing, exercise, sight seeing, or event.

11. A mobile terminal, comprising:
    a display;
    a memory; and
    a controller operatively connected to the display and the memory, the controller configured to
    present help information prompting a voice input requesting an execution of a search function for functions of the mobile terminal;

display a list of menu items corresponding to a plurality of applications of the mobile terminal in response to a receipt of the voice input requesting the execution of the search function for the functions of the mobile terminal;

display detailed information related to a menu item when the menu item is selected from the list of menu items based on a user input; and execute one of the plurality of applications corresponding to the menu item in response to a receipt of a voice command based on at least a part of the detailed information.

12. The mobile terminal of claim 11, wherein the plurality of applications comprise at least one of an application configured for executing a schedule function, an application configured for executing a memo function, an application configured for executing a video function, an application configured for executing a character, or call function.

13. The mobile terminal of claim 11, wherein the list of menu items is sorted based on at least one criterion.

14. The mobile terminal of claim 11, wherein the voice input comprises at least one word included in call content prerecorded by the mobile terminal.

15. The mobile terminal of claim 14, wherein the call content comprises at least one of incoming call content or outgoing call content.

16. The mobile terminal of claim 14, wherein the call content is stored in a database comprising data linked to the list of function items.

17. The mobile terminal of claim 11, wherein the voice input is related to information regarding time, a place, or an activity.

18. The mobile terminal of claim 17, wherein the activity comprises at least one of a meal appointment, photographing, exercise, sight seeing, or event.

* * * * *